United States Patent [19]

Solomon

[11] 4,398,892
[45] Aug. 16, 1983

[54] MUSICAL TOY

[76] Inventor: Arie Solomon, 49, Hasaifan St., Ramat Hasharon, Israel, 47 248

[21] Appl. No.: 322,448

[22] Filed: Nov. 18, 1981

[51] Int. Cl.³ .............................................. G09B 1/06
[52] U.S. Cl. ..................................... 434/259; 46/232; 84/DIG. 7
[58] Field of Search ....................... 434/200, 259, 401; 84/DIG. 7; 46/232, 33

[56] References Cited

U.S. PATENT DOCUMENTS

| | | | |
|---|---|---|---|
| 2,490,783 | 12/1949 | Cullen | 434/401 |
| 2,978,836 | 4/1961 | Kato | 46/232 |
| 3,006,111 | 10/1961 | Koch | 46/232 |
| 3,486,245 | 12/1969 | Nelson | 434/200 |
| 3,568,336 | 3/1971 | Noble | 46/232 |
| 3,760,511 | 9/1973 | Matsumoto | 434/259 |

Primary Examiner—William H. Grieb
Attorney, Agent, or Firm—Brumbaugh, Graves, Donohue & Raymond

[57] ABSTRACT

A musical toy comprising a tone generator, a plurality of spaced apart generator contacts respectively associated with differing musical tones of a musical scale; at least one set of contactor members; at least one set of receiver members uniquely adapted to receive the set of contactor members in a fixed predetermined relative position; displacing members for displacing said receiver members while maintaining said fixed relative disposition in juxtaposition to the contacts so that they are successively actuated by the receiver members in accordance with a predetermined sequence thereby generating a predetermined sequence of tones.

8 Claims, 23 Drawing Figures

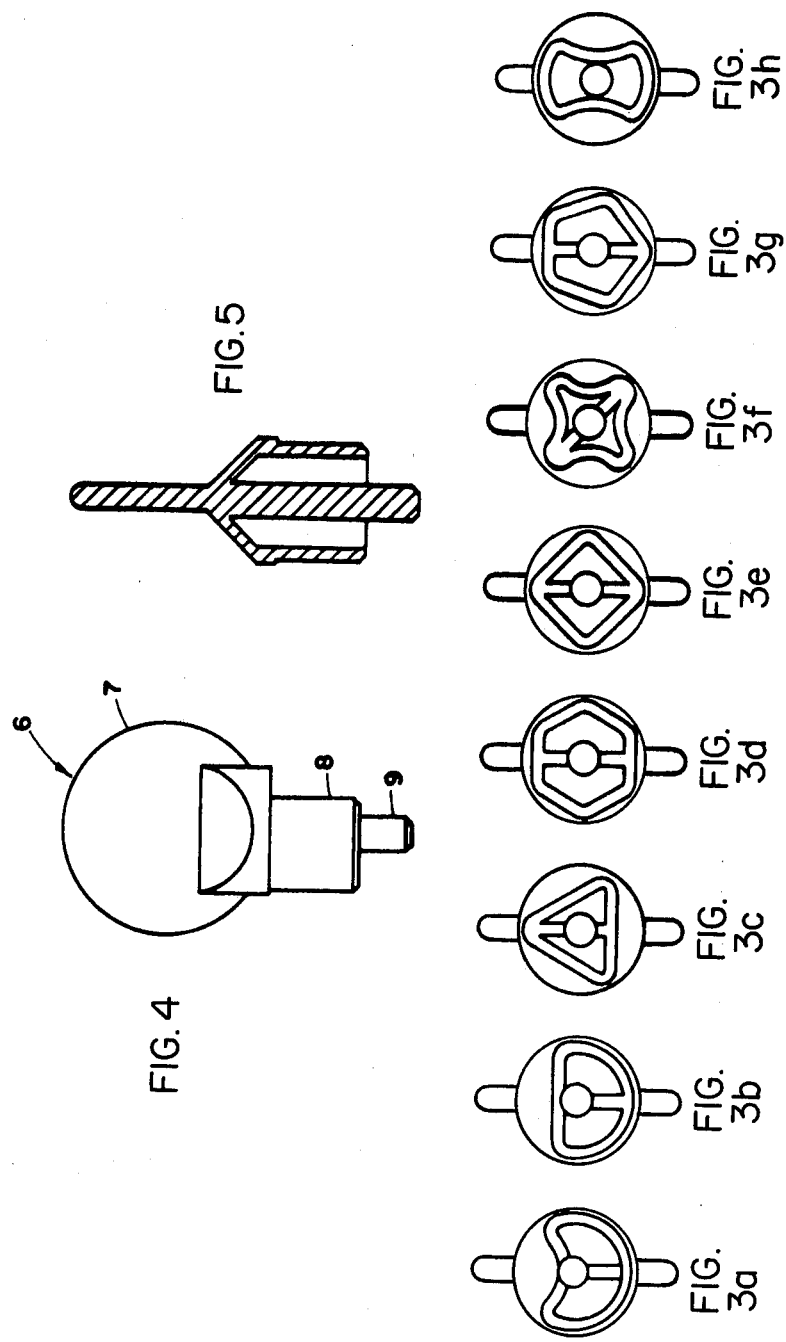

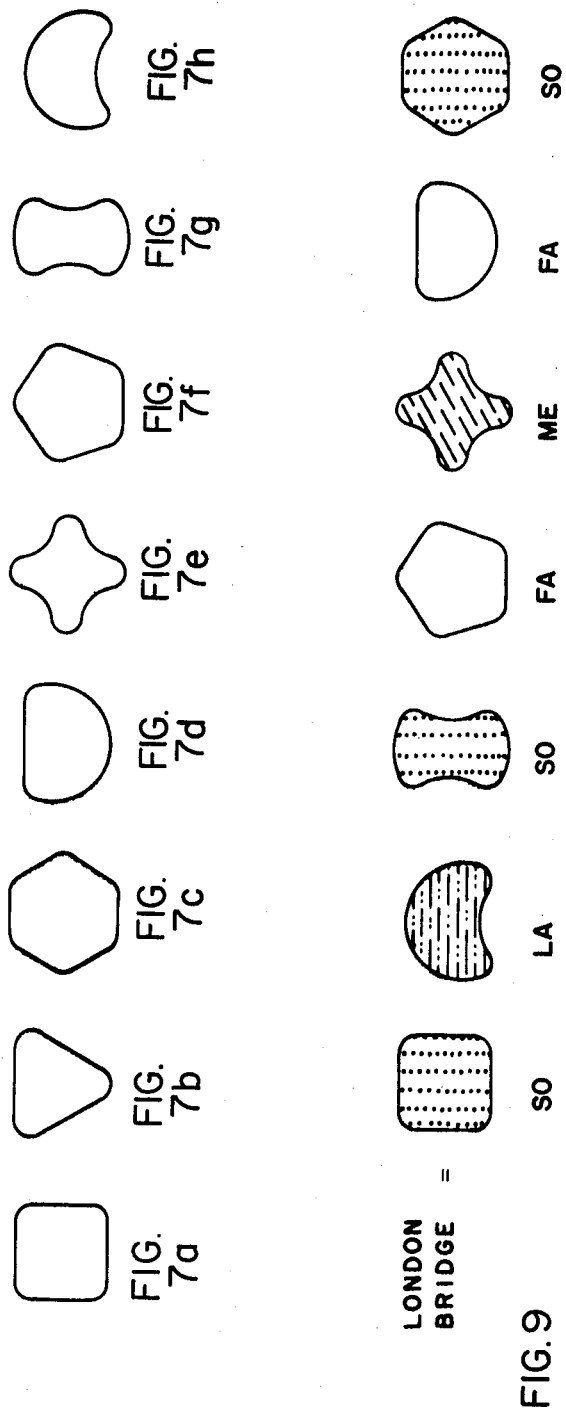
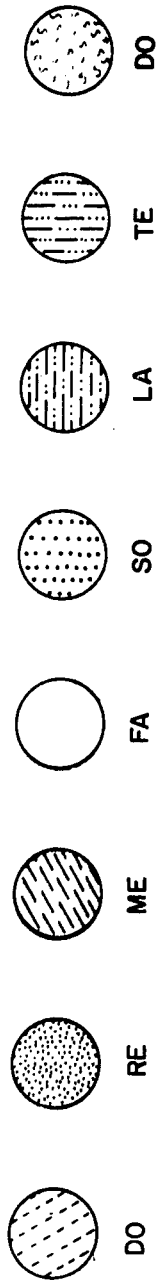

MUSICAL TOY

BACKGROUND OF THE INVENTION

This invention relates to a musical toy, primarily but not exclusively for young children, which is musically educational, is capable of developing the child's perceptive and coordinatory powers and is at the same time entertaining and diversionary.

SUMMARY OF THE INVENTION

According to the present invention there is provided a musical toy comprising a tone generator, a plurality of spaced apart generator contacts respectively associated with differing musical tones of a musical scale; at least one set of contactor members; at least one set of receiver members uniquely adapted to receive said set of contactor members in a fixed predetermined relative position; displacing means for displacing said receiver members whilst maintaining said fixed relative disposition in juxtaposition to said contacts so that they are successively actuated by said members in accordance with a predetermined sequence thereby generating a predetermined sequence of tones.

Preferably each set of receiver members are mounted with a like spatial distribution with respect to each other on one of a plurality of toothed planetary wheels in geared interengagement with a central toothed wheel.

In accordance with a preferred embodiment of the present invention each planetary wheel and apertured receiver members formed therein are associated with a specific tone of the musical scale and juxtaposed with respect to the generator contacts associated with that tone, means such as for example a distinctive colour code serving to distinguish the separate tone wheels from each other, the separate apertured receivers of each wheel being identified by distinctive shapes, the corresponding contactor members being formed into sets respectively identified by the colour code, the constituent members of each contactor member set being shaped so as to be respectively receivable by the apertured receivers.

Thus, whilst the youngest child, with his initial encounters with the musical game in accordance with the present invention, merely exercises his coordinatory powers by attempting to fit shaped contactor members into correspondingly shaped receiver members and then having done so upon rotating the central wheel generates a succession of possibly unrelated tones and in this way the child develops powers of coordination and perception of actions and results, an older child or one more experienced with the game can be presented with a special musical notation wherein each note is represented by a differently coloured contactor member and wherein the occurrence in time of that note is represented by the shape of the contactor member, the tune therefore being represented in this particular musical notation by a row of representation of differently coloured shapes. The child then proceeds to identify the contactor members corresponding in shape and colour to those set out in the musical notation provided him and proceeds to fit these contactor members successively in the correspondingly shaped apertures of the correspondingly coloured wheels.

When he has successfully completed the identification and fitting in of the appropriate contactor members in the appropriate wheel receiver apertures, rotation of the central wheel will cause a successive generation of musical tones corresponding to the musical notation, i.e. a recognizable tune. Any mistake made by the child in correct identification of, or fitting in of the contactor members is detectable by the child or by a teacher in that a discordant tune is produced.

BRIEF DESCRIPTION OF THE DRAWINGS

For a better understanding of the present invention and to show how the same may be carried out in practice, reference will now be made to the accompanying drawings in which:

FIG. 4 is a side elevation of a characteristic contactor member, FIG. 5 is a longitudinally sectioned view of the contactor member shown in FIG. 4, FIG. 8 illustrates the association between the colour code and the respective tones, FIG. 9 is a musical notation for use with the musical toy in accordance with the present invention representing a specific tune.

DESCRIPTION OF THE PREFERRED EMBODIMENT

Figure 2:
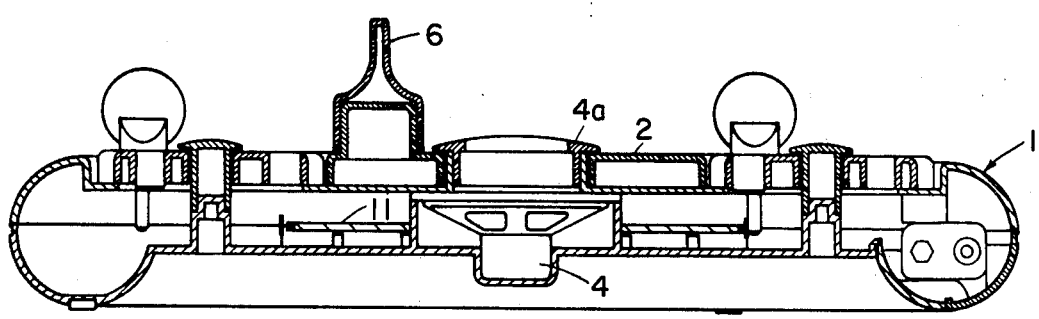
FIG. 2 is a cross-sectional view of the toy shown in FIG. 1, FIGS. 3a-3h are respective plan views from below of contactor members for use in the game in accordance with the invention.
Figure 1:
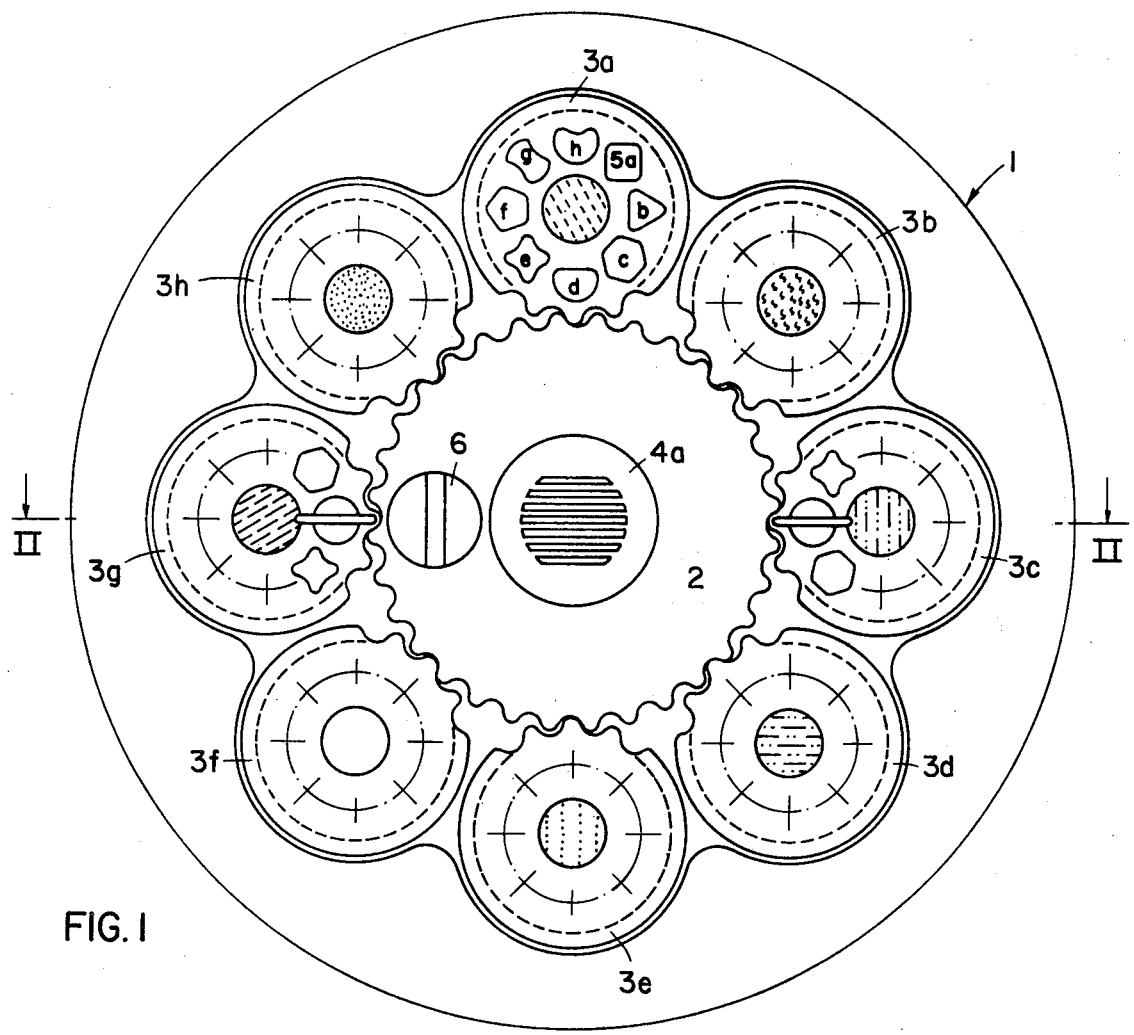
FIG. 1 is a plan view from above of the toy in accordance with the present invention.

As seen in FIGS. 1 and 2 of the drawings the musical game comprises a circular box-like frame 1 on which is rotationally mounted a central toothed wheel 2 and surrounding it eight planetary wheels 3a to 3h in geared inter-engagement with the central wheel 2. Centrally mounted on the box-like frame 1 is a loudspeaker 4 surmounted by a circular grill 4a about which the central wheel 2 is rotatable. Eccentrically mounted and extending out of the central wheel 2 is a turning handle 6. Each of the planetary wheels 3a to 3h are respectively provided with peripheral, equiangularly located, receiver apertures 5a to 5h having respectively distinctive shapes corresponding to the shapes shown in FIGS. 7a to 7h of the drawings. As can be seen, each wheel is provided with similarly shaped similarly disposed receiver apertures.

Eight sets of contactor members 6, as shown in FIGS. 3, 4 and 5 of the drawings are provided. Each contactor member 6 comprises a gripping head 7, a skirt 8 and a projecting contactor pin 9. As can be seen clearly in FIGS. 3a to 3h of the drawings, the respective skirts 8 of the constituent members of a contactor member set are of differing cross-sectional shapes corresponding to the differing receiver aperture shapes of the planetary wheels. In this way any particular contactor member when gripped by gripping head 7 can have its skirt 8 inserted into only one aperture of the receiver aperture set of any particular planetary wheel Each planetary wheel is identified by a characteristic colour (indicated by a characteristic hatching in the central portion of the planetary wheel), the colour code being shown in FIG. 8 of the drawings.

The eight respective sets of contactor members are similarly identified by eight differing colours so that each set of contactor members is associated with a particular planetary wheel.

Figure 6:
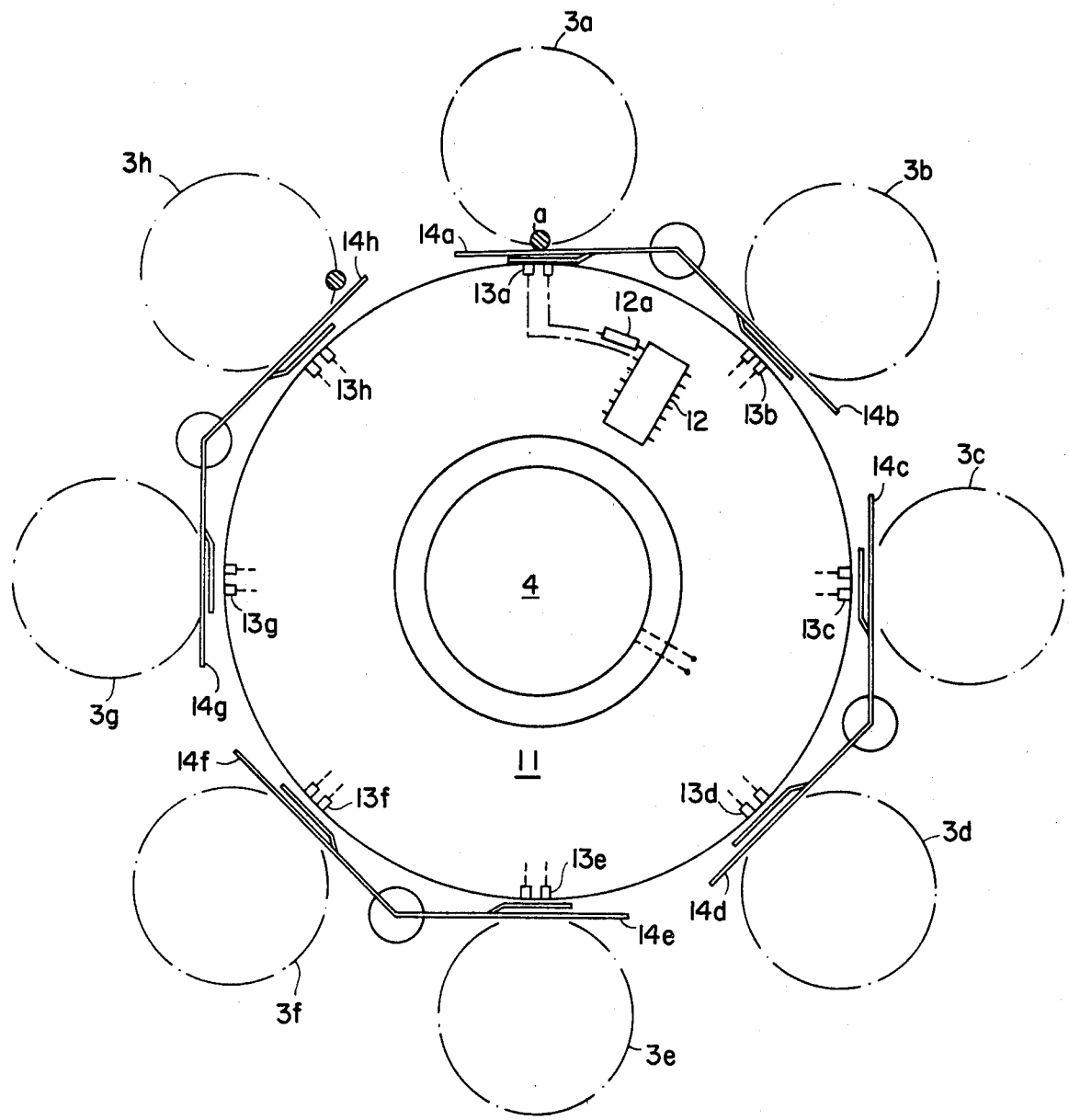
FIG. 6 is a schematic plan view representation of an electronic tone generator and associated contacts juxtaposed with respect to constituent planetary wheels of the toy shown in FIGS. 1 and 2, FIGS. 7a-7h show the respective shape sequence of receiver apertures located on each planetary wheel.

Mounted within the box-like frame 1 is a fixed mounting plate 11 which, as shown in FIG. 6 of the drawings has mounted thereon an electronic tone generator 12 having eight pairs of inputs, each pair being respectively coupled via a characteristic reactor element 12a to a separate pair of contacts 13a to 13h which, as can be seen are equiangularly distributed around the insulating periphery of the mounting plate 11 respectively opposite the planetary wheels 3a to 3h.

Located between each contact pair 13 and its juxtaposed planetary wheel 3 is one of a set of bridging contacts 14a to 14h.

As can be seen the bridging contacts 14 are normally biased out of contact with the contact pairs 13 and a bridging contact 14 is only pressed into contact with the contact pair 13a when the contactor pin 9 of a contactor member 6 presses against it as a consequence of the rotation of the associated planetary wheel 3 so as to bring that contactor member into contact with the bridging contact 14. As can be seen in the drawings this is the case with the planetary wheel 3a, the bridging contact 14a and the contact pair 13a.

The respective contact pairs 13a to 13h are associated with the eight different tones of a musical scale which can be generated by the tone generator 12. Thus, when one contact pair is bridged by a bridging contact the tone generator is actuated to generate one tone and when another contact pair is so bridged the tone generator is actuated to generate another tone.

The contact pairs 13a to 13h are respectively associated with the notes do,re,me,fa,so,lah,te,do.

In consequence the planetary wheels 3a to 3h are also respectively associated with these notes as are in consequence the colours of these wheels.

Thus in the musical notation associated with this musical toy, the eight different colours are associated with the eight different notes as shown in FIG. 8 of the drawings.

On the other hand, the eight differing receiver apertures of each planetary wheel are respectively associated with the sequence of the notes. Thus, an aperture of one shape indicates that the note of the wheel in which this aperture appears occurs at a particular instant in time whilst the aperture of another shape indicates that the shape of the wheel associated with that note occurs at a differing instance in time.

It can now be seen that a simple tune consisting of a sequence of notes can be represented by a sequence of shapes and colours.

Such a simple tune is represented in FIG. 9 of the drawings (London Bridge is Fallind Down) and a child when presented with this sequence of shapes and colours proceeds to identify, in the correct order, contact members associated with each particular shape and colour and then to fit each contact member in turn in the corresponding receiver aperture of the appropriately coloured planetary wheel.

When the child will have completed identifying, picking out and fitting the contact members are indicated above, rotation of the central wheel by means of the turning handle 6 results in the consequent rotation of the planetary wheels and the appropriate contact pairs of the tone generator are successively actuated in the sequence corresponding to the sequence shown in FIG. 9 of the drawings and there is generated the tune corresponding to the sequence, continued rotation of the central wheel resulting in the repetitive generation of the tune.

The toy is provided with a whole series of tune sequences set out in the specific musical notation here adopted and as exemplified in FIG. 9 of the drawings, and the child can therefore proceed to identify and generate each tune of the set of tunes.

It will thus be seen that this musical toy whilst being highly entertaining and diversionary for children also provides the child with valuable musical education in identifying notes and their sequence in tunes and also provides the child with valuable training in identifying shapes and associating two dimensional shapes with objects bearing these shapes and enables the child to acquire coordination by fitting the objects bearing these shapes into corresponding apertures.

It will be appreciated that whilst, in the musical toy described above, the provision of eight planetary wheels each provided with eight receiver apertures allows for the provision of simple tunes, toys can be constructed in accordance with the present invention wherein the planetary wheels have more than eight receiver apertures and/or more than eight planetary wheels are provided thereby allowing for the production of more sophisticated tunes.

Furthermore, whilst the use of the toy has been specifically described above in the production of specific preset tunes, it will be appreciated that as the child becomes more adept in the use of the toy, the child can attempt to generate tunes of his own composition.

Furthermore, the youngest children or children first introduced to the toy can acquire considerable enjoyment and can become adept merely by inserting contactor members at random in the various receiver apertures and finding out the audible results of such random insertions by turning the central wheel.

I claim:

1. A musical toy comprising a tone generator, a plurality of spaced apart generator contacts respectively associated with differing musical tones of a musical scale; at least one set of contactor members; at least one set of receiver members uniquely adapted to receive said set of contactor members in a fixed predetermined relative position; displacing means for displacing said receiver members whilst maintaining said fixed relative disposition in juxtaposition to said contacts so that they are successively actuated by said members in accordance with a predetermined sequence thereby generating a predetermined sequence of tones.

2. A musical toy according to claim 1 wherein at least a like plurality of sets of receiver members are provided, the constituent receiver members of each set having a fixed predetermined spatial disposition with respect to each other, said sets of receiver members being respectively juxtaposed with respect to said contacts, said contacts being actuated as a consequence of successive juxtaposition with respect thereto of those receiver members of the juxtaposed set of receiver members having located therein contactor members.

3. A musical toy according to claim 2 wherein each set of receiver members have a like spatial distribution with respect to each other and are mounted on a common support, said displacing means being arranged to displace said supports in synchronism.

4. A musical toy according to claim 3 wherein there is provided a central tooth wheel and a plurality of toothed planetary wheels in geared interengagement with said central wheel respectively constituting said supports; said displacing means being constituted by means for rotationally displacing said central wheel.

5. A musical toy according to claim 4 wherein the constituent receiver members of each planetary wheel comprise respective apertures peripherally distributed about said wheel, aperture identifying wheels for separately identifying each aperture, and corresponding contactor member identifying means for separately identifying each contactor member so as to correlate each contactor member with a separate aperture.

6. A musical toy according to claim 5 wherein each planetary wheel is provided with distinctive identifying means associated with a separate musical tone and wherein separate sets of contactor members are provided with corresponding identifying means whereby said sets of contactor members are respectively associated with said wheels.

7. A musical toy according to claim 6 wherein the constituent apertures of each planetary wheel are of respectively differing shapes and wherein the constituent contactor members are respectively formed so as to be uniquely receivable by said apertures.

8. A musical toy according to claim 7 wherein said planetary wheels are respectively associated with differing identifying colours and wherein said sets of contactor members are similarly associated with said colours.

* * * * *